No. 848,950.
PATENTED APR. 2, 1907.
H. WYLER.
PIPE BRACKET.
APPLICATION FILED AUG. 24, 1906.
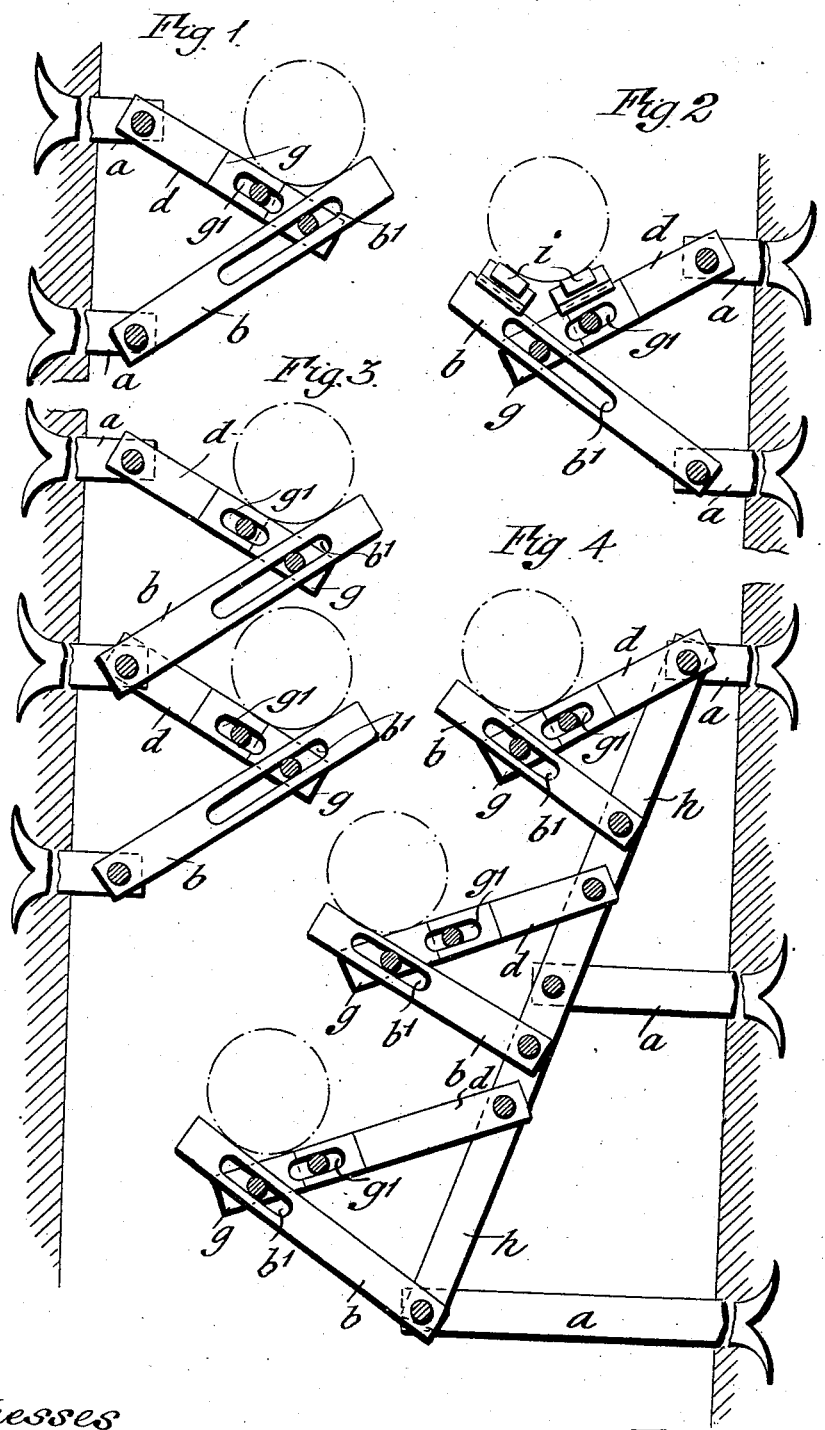

UNITED STATES PATENT OFFICE.

HEINRICH WYLER, OF LAMBRECHT, GERMANY.

PIPE-BRACKET.

No. 848,950. Specification of Letters Patent. Patented April 2, 1907.

Application filed August 24, 1906. Serial No. 331,913.

*To all whom it may concern:*

Be it known that I, HEINRICH WYLER, a subject of the German Emperor, residing at Lambrecht, in the Palatinate in Germany, have invented a certain new and useful Pipe-Bracket, of which the following is a specification.

This invention relates to an improved and horizontally and vertically adjustable support or bracket for steam-pipes, water-pipes, and the like, the purpose of the invention being to secure increased simplicity of construction and strength as compared with the adjustable pipe-supports hitherto known.

In the present invention the pipe is supported by two crossed arms, pivotally connected to the wall and provided with slots which allow of adjusting the connection between the arms, the pipe being supported at or near the part where the arms cross each other. The simplicity of this construction renders the support inexpensive, and the weight and amount of space occupied by the parts are also small, so that the conveyance thereof is facilitated. Since the support is in the nature of a bracket, it can be made of considerable strength.

The invention is illustrated in the annexed drawings by means of three examples, Figures 1 and 2 being side views of supports for single pipes, and Figs. 3 and 4 side views of composite supports for two and three pipes, respectively.

The support essentially comprises two or more bars $a$, which may be partly embedded in a wall or fixed by means of bolts, screws, clamps, or the like to a wall, beam, pillar, or other structure. To the said bars $a$ are pivoted flat bars or arms $b$ and $d$, respectively. In order that the point at which the coacting arms $b$ and $d$ intersect each other can be vertically adjusted without altering the distance of the pipe from the wall and horizontally adjusted without altering the level of the pipe, the arm $d$ is provided with an adjustable extension $g$, in which is formed a slot $g'$, and the arm or strut $b$ is provided with a slot $b'$. The connections between the arm $d$ and extension $g$ and between the latter and the arm $b$ are made by means of bolts passing through the slots $g'$ and $b'$, respectively.

In the construction shown in Fig. 4 a connecting-bar $h$ is fixed to three bars $a$, and arms $d$ and $b$ for supporting three pipes are pivotally connected to the said bar $h$. An indefinite number of supports may be arranged in this manner.

In order to as far as possible reduce the strain imposed on the supports by longitudinal expansion and contraction of the pipes through changes of temperature, roller-bearings $i$, on which the pipes rest, may be arranged on the arms $b$ and $d$, so that there is no danger of the brackets being loosened, though they are not laterally supported.

What I claim as my invention, and desire to secure by Letters Patent of the United States, is—

The combination of a longitudinally-extensible bar, a bar having a longitudinal slot, a bolt near the outer end of the extensible bar engaging said slot and means for pivotally supporting the two bars, respectively at points spaced from one another.

In witness whereof I have signed this specification in the presence of two witnesses.

HEINRICH WYLER.

Witnesses:
 WILHELM DEIKE,
 MICHAEL ZIMMERMANN.